(12) United States Patent
Flannery et al.

(10) Patent No.: US 10,902,083 B2
(45) Date of Patent: Jan. 26, 2021

(54) SYSTEM AND METHOD FOR ENHANCING INFORMATION FLOW IN AN ENTERPRISE

(71) Applicant: Avaya Inc., Santa Clara, CA (US)

(72) Inventors: Peter Flannery, Galway (IE); Cathal Mac Donnacha, County Galway (IE); Lee Malcolm, County Galway (IE)

(73) Assignee: Avaya Inc., Durham, NC (US)

( * ) Notice: Subject to any disclaimer, the term of this patent is extended or adjusted under 35 U.S.C. 154(b) by 232 days.

(21) Appl. No.: 14/302,590

(22) Filed: Jun. 12, 2014

(65) Prior Publication Data

US 2015/0363736 A1    Dec. 17, 2015

(51) Int. Cl.
| | |
|---|---|
| *G06F 16/95* | (2019.01) |
| *G06F 16/958* | (2019.01) |
| *G06Q 10/06* | (2012.01) |
| G06F 16/242 | (2019.01) |
| G06F 16/9535 | (2019.01) |
| G06F 21/55 | (2013.01) |

(52) U.S. Cl.
CPC ..... *G06F 16/958* (2019.01); *G06Q 10/06398* (2013.01); *G06F 16/244* (2019.01); *G06F 16/9535* (2019.01); *G06F 21/552* (2013.01); *G06Q 10/063* (2013.01)

(58) Field of Classification Search
USPC ......................................................... 707/748
See application file for complete search history.

(56) References Cited

U.S. PATENT DOCUMENTS 8,504,486 B1 *  8/2013  Pinto .................. G06Q 30/0631
                                                          705/1.1
2003/0182413 A1 *  9/2003  Allen ....................... H04L 12/14
                                                          709/223
2004/0157193 A1 *  8/2004  Mejias ..................... G09B 7/00
                                                          434/118
2007/0124493 A1 *  5/2007  Fogg .................. H04L 29/06027
                                                          709/231
2009/0119258 A1 *  5/2009  Petty ...................... G06Q 10/10
2010/0077301 A1 *  3/2010  Bodnick ................ G06Q 30/02
                                                          715/274
2013/0226820 A1 *  8/2013  Sedota, Jr. ......... G06Q 30/0201
                                                          705/319
2014/0281917 A1 *  9/2014  Alpern ................ G06F 17/2247
                                                          715/234
2015/0128039 A1 *  5/2015  Wieder ................... G06F 21/10
                                                          715/716
2015/0220644 A1 *  8/2015  Motoyama ........ G06F 17/30967
                                                          707/706
2015/0254791 A1 *  9/2015  Stockton ................ G06Q 50/18
                                                          705/7.28

* cited by examiner

*Primary Examiner* — Tamara T Kyle
*Assistant Examiner* — Raheem Hoffler
(74) *Attorney, Agent, or Firm* — Stevens & Showalter LLP

(57) ABSTRACT

A system for enhanced information flow in an enterprise is disclosed. The system includes a monitoring module configured to determine one or more metrics associated with at least one of an agent or a data item. The system further includes a rating module configured to provide a rating to the data item based on the one or more metrics associated with the at least one of the agent or the data item. The system further includes a computing module configured to compute a review parameter based on the rating of the data item. The system further includes a display module configured to display an indicator associated with the computed review parameter.

18 Claims, 6 Drawing Sheets

SYSTEM AND METHOD FOR ENHANCING INFORMATION FLOW IN AN ENTERPRISE

BACKGROUND

Field

Embodiments of the present invention generally relate to a system and method to manage data items in an enterprise and particularly to a system and method for enhancing information flow in the enterprise.

Description of Related Art

Contact centers are employed by many enterprises to service inbound and outbound contacts from customers. A primary objective of contact center management is to ultimately maximize contact center performance and profitability. An ongoing challenge in contact center administration is monitoring and optimizing contact center efficiency in usage of its available resources. The contact center efficiency is generally measured by metrics such as Service Level Agreement (SLA), Customer Satisfaction (CSAT), and match rate. Contact center resources may include, agents, communication assets (e.g., number of voice trunks, number and bandwidth of video trunks, etc.), computing resources (e.g., a speed, a queue length, a storage space, etc.), and so forth.

Service level is one measurement of the contact center efficiency. Service level is typically determined by dividing the number of contacts accepted within the specified period by the number accepted plus the number that were not accepted, but completed in some other way (e.g., abandoned, given busy, canceled, flowed out). Service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent for a queue over the same period. An agent with a primary skill level is one that typically may handle contacts of a certain nature more effectively and/or efficiently as compared to an agent of lesser skill level. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with the service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness and the like, to calculate performance relative to their Service Level Agreements ("SLAs"). Operational efficiency is achieved when the KPIs are managed near, but not above, SLA threshold levels.

Throughput is a measure of the number of calls/contact requests or work requests that may be processed in a given amount of time. Agent utilization is a measure of how efficiently agents' time is being used. Customer service level is a measure of the time customers spend waiting for their work to be handled. Company contact center customers wish to provide service to as many requests as possible in a given amount of time, using the least number of agents to do so, and minimizing the wait time for their customers that may increase the Service Level Agreement (SLA) of the contact center.

Further, the contact center may also have to maintain the Customer Satisfaction (CSAT) metrics in order to maintain the KPIs of the contact center. For this purpose, agents may have to maintain the quality of services provided to the customers through multimedia (e.g., voice calls, video calls, emails, etc.). Generally, typed communication or drafts such as emails, documents, etc. are passed through a review process to ensure that a good quality of work is provided to the customers. The review of the drafts may be done by the agents and/or supervisors of the contact center. The agents may then have to perform multitasking to handle the work assigned to them and simultaneously, reviewing the draft composed by another agent of the contact center. For example, an agent handling a voice service request from a customer simultaneously reviews an email drafted by another agent of the contact center. However, this type of multitasking by the agents may cause more errors due to insufficient attention in the review process and may further deteriorate the quality of content of final drafts sent to the customers.

In conventional review processes, the drafts (e.g., an email, or a document) may be reviewed based on some key factors, such as experience of an agent within the contact center. For example, an email drafted by a newly hired agent is sent directly to their supervisor prior to being sent to a customer and further the newly hired agent may be allowed to review a set sample of documents composed in the contact center. Further, the agent or a reviewer receiving the draft may also be provided with a review notification that may include name of the author, reviewer's data, comments and/or changes by the reviewers, and so forth. However, with this basic information the reviewer cannot accurately estimate the optimum amount of time required to review the draft.

For example, a reviewer may spend excessive time reviewing a draft that may already be of a good quality (i.e., draft composed by a primary skill agent) that does not require a thorough review. On the other hand, a reviewer may not devote quality time to review a draft based on the displayed notification (e.g., an author name, name of reviewers, etc.) provided to the reviewer, which may result in errors and further reduces the quality of the draft content.

There is thus a need for a system and method for enhancing the information flow in an enterprise to improve the quality of content provided to customers.

SUMMARY

Embodiments in accordance with the present invention provide a system for enhanced information flow in an enterprise. The system includes a monitoring module configured to determine one or more metrics associated with at least one of an agent or a data item. The system further includes a rating module configured to provide a rating to the data item based on the one or more metrics associated with the at least one of the agent or the data item. The system further includes a computing module configured to compute a review parameter based on the rating of the data item. The system further includes a display module configured to display an indicator associated with the computed review parameter.

Embodiments in accordance with the present invention further provide a computer-implemented method for enhancing information flow in an enterprise. The computer-implemented method includes determining one or more metrics associated with at least one of an agent or a data item, providing a rating to the data item based on the one or more metrics associated with the at least one of the agent or the data item, computing a review parameter based on the rating of the data item, and displaying an indicator associated with the computed review parameter.

Embodiments in accordance with the present invention further provide a computer-implemented method for enhancing information flow in an enterprise. The method includes determining one or more metrics associated with at least one of an agent or a data item, providing a rating to the data item based on the one or more determined metrics of the at least one of the agent and the data item, updating a database with the rating of the data item, computing a review parameter based on the updated rating of the data item, selecting a reviewer based on the computed review parameter, and displaying an indicator for the computed review parameter to the selected reviewer.

Embodiments of the present invention may provide a number of advantages depending on its particular configuration. First, present application provides a system and a method for determining whether a data item needs a review based on one or more metrics of an agent and/or author of the draft, one or more metrics of a reviewer, and one or more metrics of the data items. Further, embodiments of the present invention compute an optimum time required by the reviewer to review the assigned draft. The optimum review time may be computed based on the one or more metrics of the author, reviewer(s), and data items. Also, based on the computed review time, the agents and/or supervisors of the contact center may plan their time for handling the workload. Further, embodiments of the present invention compute a rating value required by the reviewer to review the assigned draft. The rating value may be computed based on the one or more metrics of the author, reviewer(s), and data items. Also, based on the computed rating value, the reviewers of the contact center may determine how much attention (e.g., moderate, intense, etc.) is needed for reviewing the draft.

Further, the embodiments of the present invention provide a system and a method to analyze common errors of the agents and the reviewers that degrades the quality of the data items. The analysis may then be used to improve the quality of the data items. Furthermore, a review notification (thoroughness and optimum review time and/or effort required by the reviewer) is displayed as an indicator on the reviewer's computer screen.

These and other advantages will be apparent from the present application of the embodiments described herein.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1A:
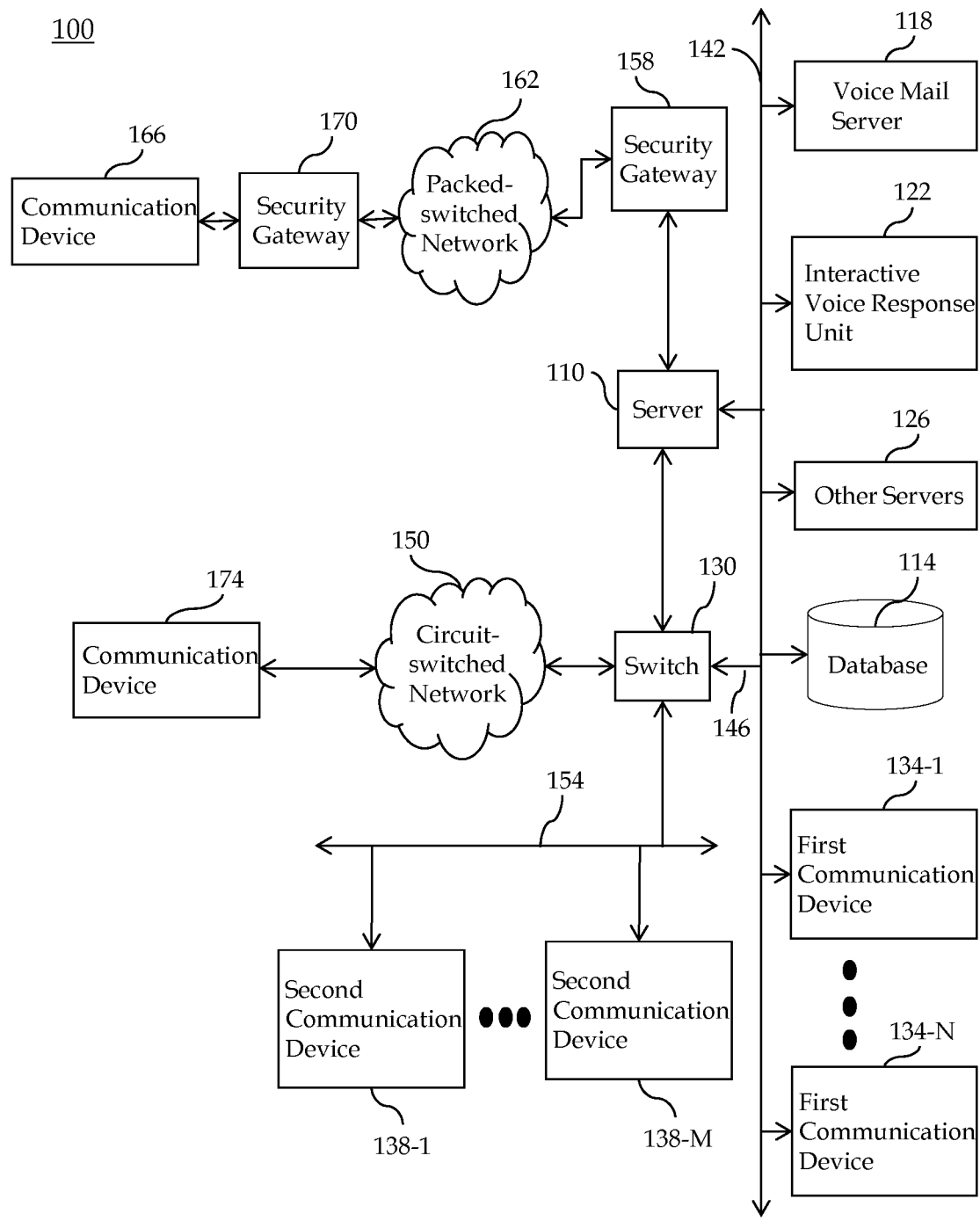
FIG. 1A illustrates a block diagram depicting a contact center, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to an e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an Automatic Call Distribution (ACD), an enterprise switch, or other type of communications system switch or server, as well as other types of processor-based communication control devices such as media servers, computers, adjuncts, etc.

FIG. 1A shows an illustrative embodiment of the present invention. A contact center 100 comprises a server 110, a set of data stores or databases 114 containing contact (or call) or customer related information, data items, and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)).

In an embodiment of the present invention, the database 114 may store data items associated with the agents of the contact center 100. The data items may include, but is not restricted to, emails, documents, reports, and so forth. The data items may be stored in more than one database of the contact center 114, in another embodiment of the present invention. The database 114 may further store metrics associated with the agents, supervisors, and the data items, in another embodiment of the present invention. Further, the database 114 may also store a rating associated with the data items. Further, the database 114 may store a formula or a mathematical algorithm that may be used to enhance information workflow in the contact center 100.

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A) may be Avaya Inc.'s, G700 Media Gateway™ and may be implemented as hardware such as via an adjunct processor (as shown) or as a chip in the server 110.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that the embodiments of present invention do not require any particular type of information transport medium between switch, or server and first and second communication devices, i.e., the embodiments may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized that the configuration of the switch 130, the server 110, user communication devices, and other elements as shown in FIG. 1A is for purposes of illustration only and should not be construed as limiting embodiments of the present invention to any particular arrangement of elements.

Further, the server 110 is notified via the LAN 142 of an incoming service request or work item by the communications component (e.g., switch 130, a fax server, an email server, a web server, and/or other servers) receiving the incoming service request as shown in FIG. 1A. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

Figure 1B:
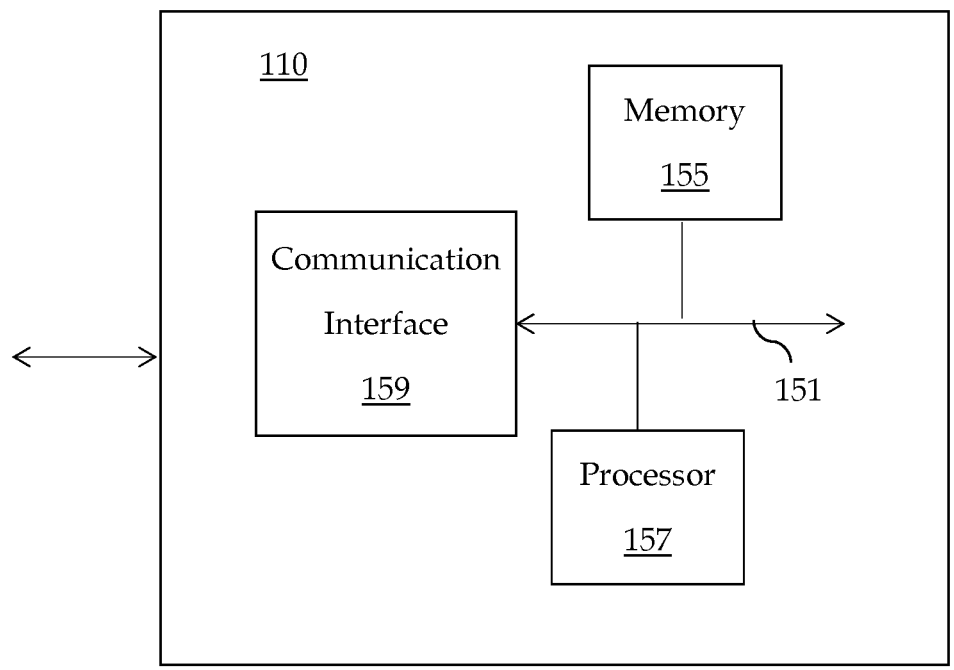
FIG. 1B illustrates a high level hardware abstraction of a block diagram of a server, according to an embodiment of the present invention.

FIG. 1B illustrates at a relatively high level of hardware abstraction a block diagram of a server such as the server 110, in accordance with an embodiment of the present invention. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out the various functions of the server 110.

Although embodiments are discussed with reference to client-server architecture, it is to be understood that the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments do not require the presence of packet- or circuit-switched networks.

The term "switch" or "server" as used herein should be understood to include a Private Branch Exchange (PBX), an ACD, an enterprise switch, an enterprise server, or other type of telecommunications system switch or server, as well as other types of processor-based communication control devices such as media servers, computers, adjuncts, etc.

Figure 2:
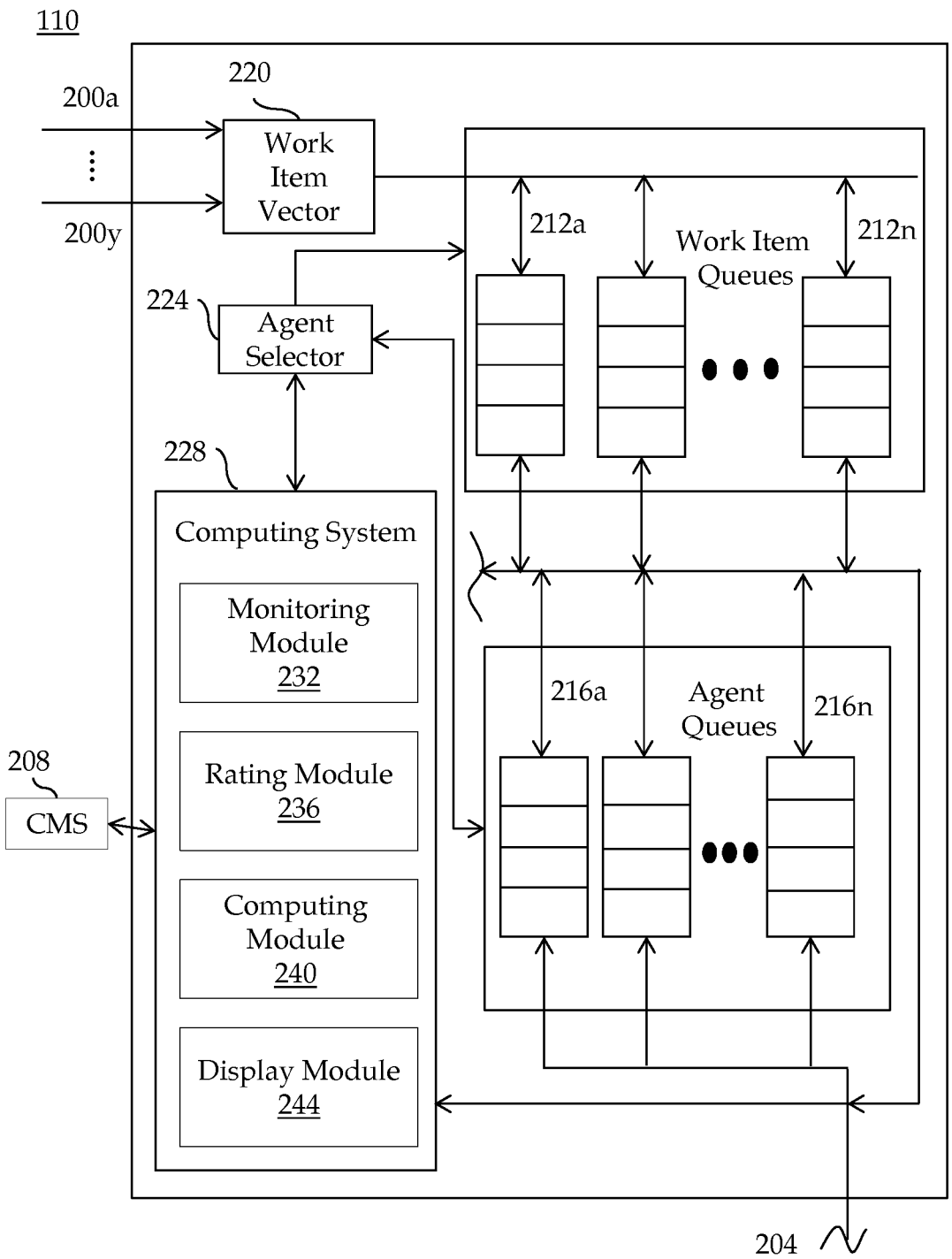
FIG. 2 illustrates a functional block diagram of the server, according to an embodiment of the present invention.

Referring to FIG. 2, one possible configuration of the server 110 is depicted at a relatively high level of functional abstraction. The server 110 is in communication with a plurality of customer communication lines 200a-y (which may be one or more trunks, phone lines, etc.) and an agent communication line 204 (which may be a voice-and-data transmission line such as the LAN 142 and/or a circuit switched voice line). The server 110 may include Avaya Inc.'s an Operational Analyst™ (OA) with On-Line Analytical Processing (OLAP) technology or a Call Management System (CMS) 208 that gathers contact records. OA and CMS will hereinafter be referred to jointly as CMS 208.

As shown in FIG. 2, among the data stored in the server 110 is a set of contact or work item queues 212a-n and a separate set of agent queues 216a-n. Each contact queue 212a-n corresponds to a different set of agent queues, as does each agent queue 216a-n. Conventionally, contacts are prioritized and either are queued in individual ones of the contact queues 212a-n in their order of priority or are queued in different ones of a plurality of contact queues that correspond to a different priority. Likewise, each agent's queues are prioritized according to his or her level of expertise or skill in that queue, and agents are queued in either individual ones of agent queues 216a-n in their order of expertise level or in different ones of a plurality of agent queues 216a-n that correspond to a queue and each one of which corresponds to a different expertise level.

According to an embodiment of the present invention, included among the control programs in the server 110 is a work item vector 220. Contacts or calls incoming to the contact center 100 are assigned by the work item vector 220 to different work item queues 212a-n based upon a number of predetermined criteria, including customer identity, customer needs, contact center needs, current contact center queue lengths, customer value, and the agent skill that is required for proper handling of the contact. Agents who are available for handling work items are assigned to agent queues 216a-n based upon the skills that they possess. An agent may have multiple skills, and hence may be assigned to multiple agent queues 216a-n simultaneously. Furthermore, an agent may have different levels of skill expertise (e.g., skill levels 1-N in one configuration or merely primary skill levels and secondary skill levels in another configuration), and hence may be assigned to different agent queues 216a-n at different expertise levels.

In one configuration, the contact center 100 is operated by a contract operator (e.g., a supervisor or a manager of the contact center 100), and each of the work request queues 212a-n, and possibly each of the agent queues 216a-n, corresponds to a different client. Each client may have a separate Service Level Agreement (SLA) or other type of performance measurement agreement with the contract operator regarding performance expectations, goals, requirements or specifications for the client's respective queue(s).

Further, embodiments in accordance with the present invention may include, among the programs executing on the server 110, an agent selector 224 and a computing system 228. The agent selector 224 and the computing system 228 are stored either in the main memory or in a peripheral memory (e.g., disk, CD ROM, etc.) or some other computer-readable medium of the contact center 100. Further, the agent selector 224 monitors the occupants of the work item and agent queues 212*a-n* and 216*a-n*, respectively, and contact center objectives, rules, and policies and assigns agents to service work items.

The agent selector 224 distributes and connects these work items to communication devices of available agents based on the predetermined criteria noted above. When the agent selector 224 forwards a contact (or first work item) to an agent, the agent selector 224 also forwards customer-related information from the database 114 to the agent's desktop or computer work station for previewing and/or viewing (such as by a pop-up display) to enable the agent for providing better services to the customer. Depending on the contact center configuration, the agent selector 224 may reallocate the work items to the agents of the contact center 100. The agents process the contacts or work items sent to them by the agent selector 224.

In an embodiment of the present invention, the agent and their associated data are maintained and updated in the database 114 of the contact center 100. Upon the completion of handling a work item, a generator (not shown) collects selected metrics for the work item. These metrics may include skills involved in servicing the work item, an identifier of a servicing agent, contact duration, a transaction or contact type (e.g., sale, information request, complaint, etc.), time-of-day, result of the call (e.g., type of sale, number of units sold, an average revenue generated, etc.), rating of another party, such as the agent's supervisor or another observer, of how the work item was serviced, whether the agent requested assistance, etc. and stores the information in the database 114, such as the CMS 208.

In an exemplary embodiment of the present invention, the computing system 228 is configured to manage review processes of the data items based upon real-time metrics of the agents and their associated data items within the contact center 100. An estimated review time for the data items is computed based upon the metrics of the agents or reviewers (one who reviews data items) of the data items, and the estimated review time is then displayed as an indicator to the reviewer's computer screen. The displayed estimated review time may help the reviewer to manage the workload along with the reviewing of the data item. Further, the computing system 228 may provide an opportunity to the supervisors of the contact center 100 to analyze common mistakes and errors of the authors and reviewers in the data items. These mistakes and errors may further be used to improve the quality of data items at an initial stage.

According to an embodiment of the present invention, the computing system 228 includes certain modules, such as, but is not restricted to, a monitoring module 232, a rating module 236, a computing module 240, and a display module 244. In some embodiments, one or more of monitoring module 232, a rating module 236, a computing module 240, and a display module 244 may be implemented by one or more software processes running on the server 110. The server 110 may implement the one or more software processes by use of the processor 157 being suitably programmed by use of software instructions stored in the memory 155 coupled to the processor 157.

The monitoring module 232 may monitor data items, in an embodiment of the present invention. The data items may include, but is not restricted to an email, a document, a report, and so forth. In an embodiment of the present invention, an author (i.e., writer of the data item) of the data item may be an agent of the contact center 100. The author of the data item may be a supervisor of the contact center 100, in another embodiment of the present invention. Further, the author of the data item may be a Subject Matter Expert (SME) of a particular technology or a domain within the contact center 100. In an embodiment of the present invention, the SME may be an agent or the supervisor of the contact center 100.

The monitoring module 232 may also monitor data items to determine metrics associated with the data items, in an embodiment of the present invention. The metrics of the data items may include, but is not restricted to, a number of words in a data item, an elapsed time from start of composition time to completion time for a data item, time required to review previous data items from an author, a time of day (e.g., an email sent to a customer near to closing of business), a day of the week, a composition date of the data item (e.g., the author may perform differently after a public holiday), a number of reviewers already reviewed the data item, amount of time spent on the review of the data item, and so forth.

Further, the monitoring module 232 may also monitor data items to determine metrics of the author and/or agent associated with the data item. In an embodiment of the present invention, the metrics associated with the author may include, but is not restricted to, a number of simultaneous activities performed by the author while composing the data item, a list of applications running on the author's computer at the time of composing the data item, a number of times the author switches between the data item and other applications while composing the data item, a number of changes made to previous data items during a review by the author, an average rating of the author, agent returns from a vacation and/or leaves, total experience and/or time of the agent on the job, and so forth. The monitoring module 232 may monitor data items to determine the metrics associated with the authors by monitoring activities and/or behavior of the authors, in an embodiment of the present invention.

Furthermore, the monitoring module 232 may monitor data items to determine metrics associated with one or more reviewers of the data items, in an embodiment of the present invention. The metrics associated with the reviewer may include, but is not limited to, a number of simultaneous activities performed by the reviewer while reviewing the data item (e.g., a supervisor working on multiple contacts), an average rating of the reviewer, role of the reviewer (e.g., an agent or a supervisor) in the contact center 100, reviewer returns from a vacation and/or leaves, total experience and/or time of the reviewer on the job, and so forth. The monitoring module 232 may monitor data items to determine the metrics associated with the reviewers by monitoring activities and/or behavior of the reviewers, in an embodiment of the present invention.

Further, the monitoring module 232 may monitor data items to determine metrics associated with a customer of the data item, in an embodiment of the present invention. The metrics associated with the customer may include, but is not restricted to, a priority of the customer (e.g., gold or silver rated customer), and so forth. The gold rated customer may be an oldest customer of the contact center 100, and the silver rated customer may be a new customer of the contact center 100.

The rating module 236 may provide a rating to the data item, in an embodiment of the present invention. The rating module 236 may provide a rating to the data item based on the one or more determined metrics of the author of the data item. The rating module 236 may also provide a rating to the data item based on the one or more determined metrics of the reviewer associated with the data item, in another embodiment of the present invention. Further, the rating module 236 may also provide a single rating to the data item based on the one or more determined metrics of the author, the one or more determined metrics of the data item, and the one or more determined metrics of the reviewer, in yet another embodiment of the present invention. For example, a rating (e.g., 1 star) is provided to the data item that means a reviewer has to invest a large amount of time for reviewing the data item to improve its content quality.

Further, the rating module 236 may provide a rating or weight to each of the metrics, in an embodiment of the present invention. For example, a metrics "a number of applications running on the author's computer screen" may have a lower rating than a metric "a number of activities being worked on simultaneously by the author while composing the data item".

The rating module 236 may further update the ratings of the metrics associated with the data items in the database 114 of the contact center 100. In another embodiment of the present invention, the ratings of the authors are updated in the database 114 of the contact center 100. The rating module 236 may also update the ratings of the reviewers in the database 114 of the contact center 100, in yet another embodiment of the present invention. Further, the rating module 236 may tag or attach the ratings to the data items each time the data items are processed through a review process.

The computing module 240 may compute a review parameter for the data items. The review parameter may include, but is not restricted to, a review time, a review value, a level of attention needed to review the data items, and the like. In one embodiment of the present invention, the computing module 240 may compute a review time for the data items, in an embodiment of the present invention. The computing module 240 may compute a review time for the data items based on the ratings of the data items. As discussed, the ratings are provided by the rating module 236. The computing module 240 refers the database 114 to fetch the ratings and context of the data items. In an embodiment of the present invention, the context of the data items may include, but is not restricted to, metrics of the data items, metrics of the authors, metrics of the reviewers, and so forth. Based on the data, the computing module 240 may compute an estimated review time for the data items. In an embodiment of the present invention, the computing module 240 may use a predefined mathematical algorithm to compute the review parameter for the data items.

The computing module 240 may compute a review parameter (e.g., a review time) for the data items based on the one or more determined metrics of the authors, in another embodiment of the present invention. For example, if the author of the data item is the supervisor of the contact center 100, then the computed review time for the data item may be less as compared to if the author of the data item is the agent of the contact center 100. In another embodiment of the present invention, the computing module 240 may compute a review time for the data items based on the one or more determined metrics of the reviewers. For example, if the reviewer is the supervisor of the contact center 100, then the computed review time for the data item may be less.

The computing module 240 may also compute a rating value for the data items based on the one or more determined metrics of the author, in an embodiment of the present invention. The computing module 240 may compute a rating value for the data items based on the one or more determined metrics of the reviewer, in another embodiment of the present invention. Also, based on the computed rating value, the reviewers of the contact center 100 may determine how much attention (e.g., moderate, intense, etc.) is needed for reviewing the draft. In yet another embodiment of the present invention, the computing module 240 may compute a rating value for the data items based on the one or more determined metrics of the data items.

Further, the computing module 240 may select a reviewer for the data item based on the computed parameter such as, an estimated review time, in an embodiment of the present invention. The reviewer may be another agent, or a supervisor of the contact center 100. The supervisor may be selected based on the computed review time required to review the data item, in an embodiment of the present invention. Further, the supervisor or the agent may be selected based on their availability and current workload.

The display module 244 may display an indicator associated with the computed parameter. The indicator may include, but is not restricted to a graphical icon, a percentage value, a comment, a time value, a rating value, and so forth. In an embodiment of the present invention, the graphical icon may summarize or reflect elements of the ratings by displaying a number of stars on the reviewer's computer screen. The display module 244 may display a percentage value on the reviewer's computer screen, which describes the position of a spoke on a normal distribution curve relative to other reviews, in another embodiment of the present invention. The time value or range is displayed on the reviewer's computer screen, which describes an estimate of an optimum review time range (minimum and maximum review time) the reviewer may spend on the review task, in yet another embodiment of the present invention.

Figure 3:
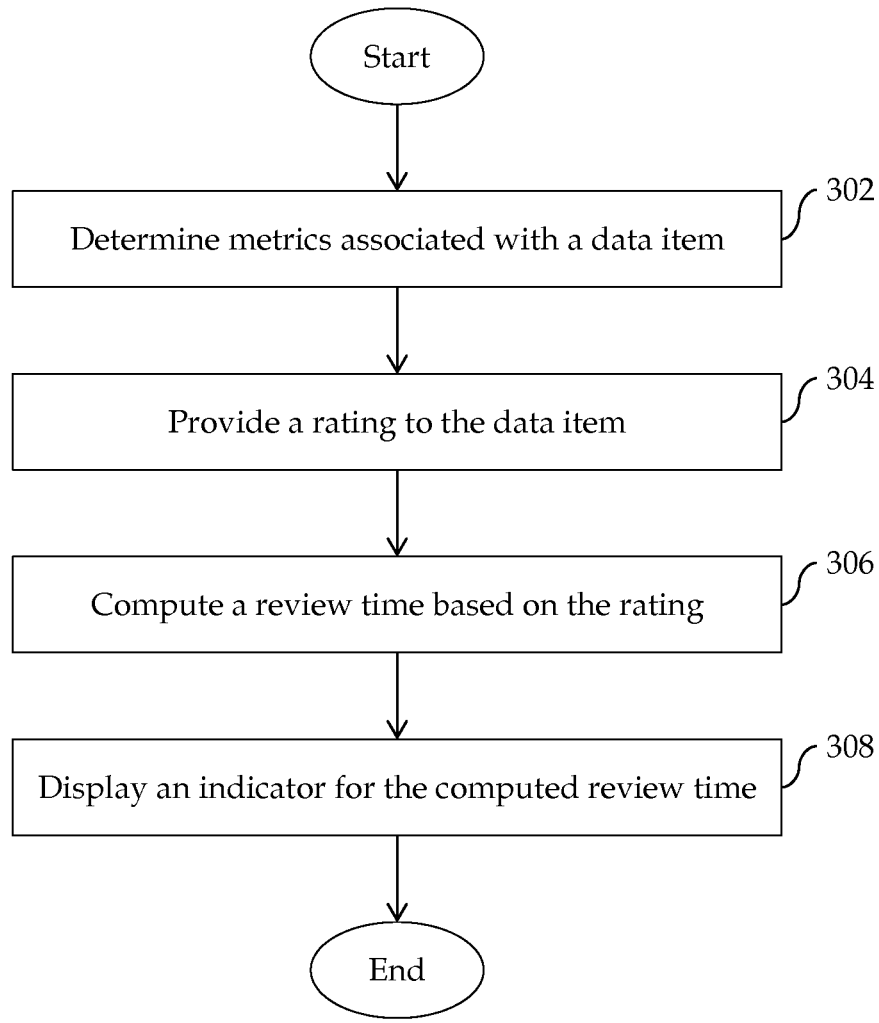
FIG. 3 depicts a flowchart of a method for enhancing information flow in the contact center, according to an embodiment of the present invention.

FIG. 3 depicts a flowchart of a method for enhancing information flow in the contact center 100, according to an embodiment of the present invention.

At step 302, a computing system 228 determines metrics associated with a data item to be reviewed. The data item may include, but is not restricted to an email, a document, a report, and so forth. In an embodiment of the present invention, the metrics may also be associated with, but is not restricted to, an agent and/or author, a reviewer, a data item, and so forth. The metrics associated with the data items may include, but is not restricted to, a number of words in the data item, an elapsed time from start of composition time to completion time for the data item, time required to review previous data items from an author, a time of day, a day of the week, a composition date of the data item, amount of time spent on the review of the data item, and so forth.

The metrics associated with the author may include, but is not restricted to, a number of simultaneous activities performed by the author while composing the data item, a list of applications running on the author's computer screen at the time of composing the data item, a number of changes made to previous data items during a review by the author, an average rating of the author, and so forth. The metrics associated with the reviewer may include, but is not restricted to, a number of simultaneous activities performed by the reviewer during the review, an average rating of the reviewer, a role of the reviewer in the contact center 100 (e.g., an agent or a supervisor), and so forth. Further, the determined metrics may be stored in a database of the contact center 100 for further analysis.

At step 304, the computing system 228 provides a rating to the data item. In an embodiment of the present invention, the rating may be provided to the data item based on the determined metrics of the data item. The computing system 228 may also provide a rating to the data item based on the one or more determined metrics of the author and/or one or more reviewers associated with the data item, in another embodiment of the present invention. Further, the computing system 228 may also provide a single rating to the data item based on the one or more determined metrics of the author, the one or more determined metrics of the reviewer, and the one or more determined metrics of the data item, in yet another embodiment of the present invention. For example, if the data item is composed by a supervisor of the contact center 100, then a high rating such as a 4 stars rating is assigned to the data item.

At step 306, the computing system 228 may compute a review time for the data item. In an embodiment of the present invention, the review time for the data item may be computed based on the rating provided to the data item. For instance, in the above example, the data item is assigned with a 4 stars rating, therefore, the review time for the data item may be computed as 5 minutes. The computing system 228 may use a predefined mathematical algorithm to compute the review time for the data item, in an embodiment of the present invention.

At step 308, the computing system 228 displays an indicator associated with the computed review time on the reviewer's computer. The displayed indicator may provide a summary to the reviewer, which may include, but is not restricted to, the rating and context of the data item. In an embodiment of the present invention, the indicator may include, but is not restricted to, a graphical icon, a percentage value, a comment, a review time range, a rating value, and so forth.

Figure 4A:
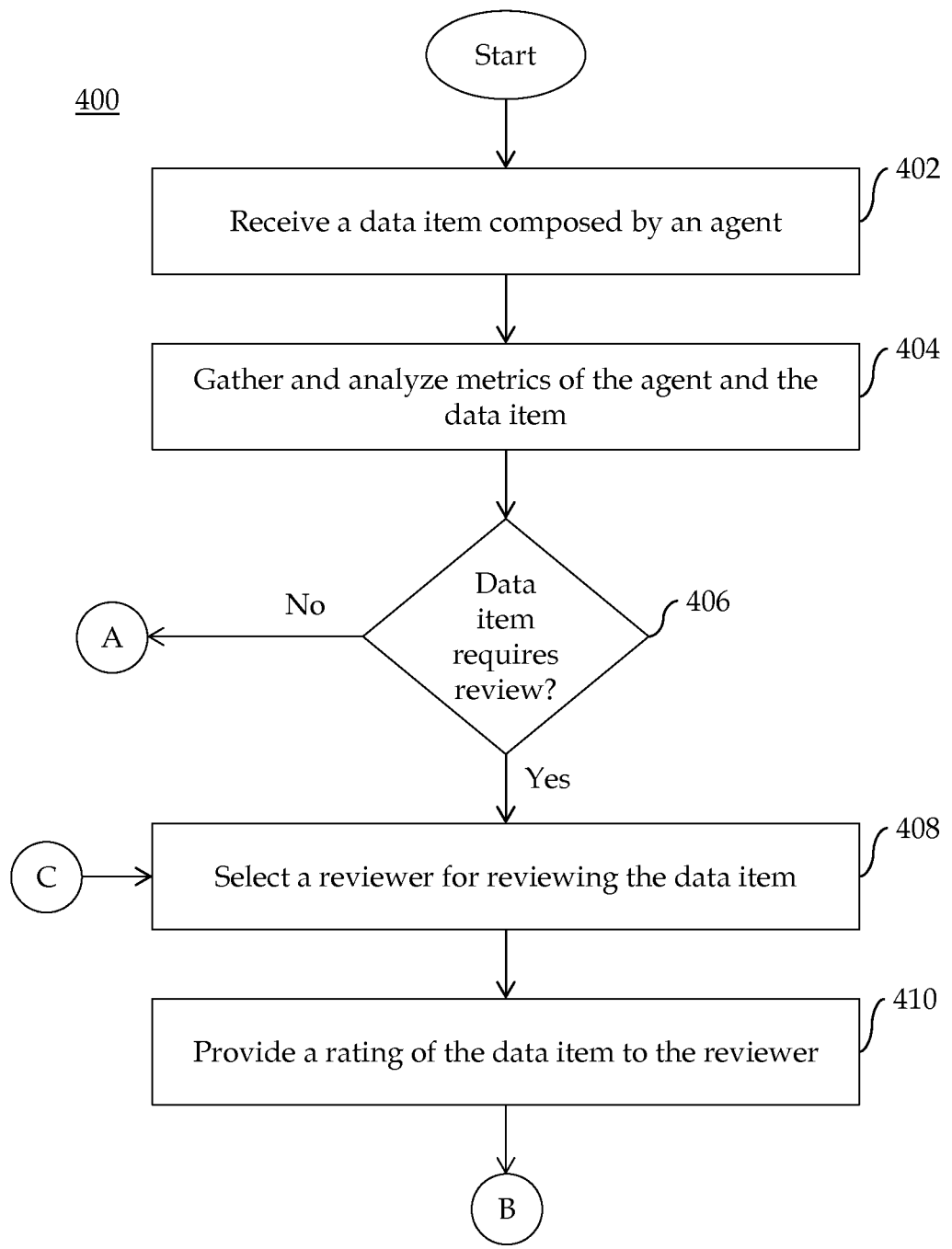
FIGS. 4A and 4B depict a flowchart of a method for enhancing information flow in the contact center, according to another embodiment of the present invention.
Figure 4B:
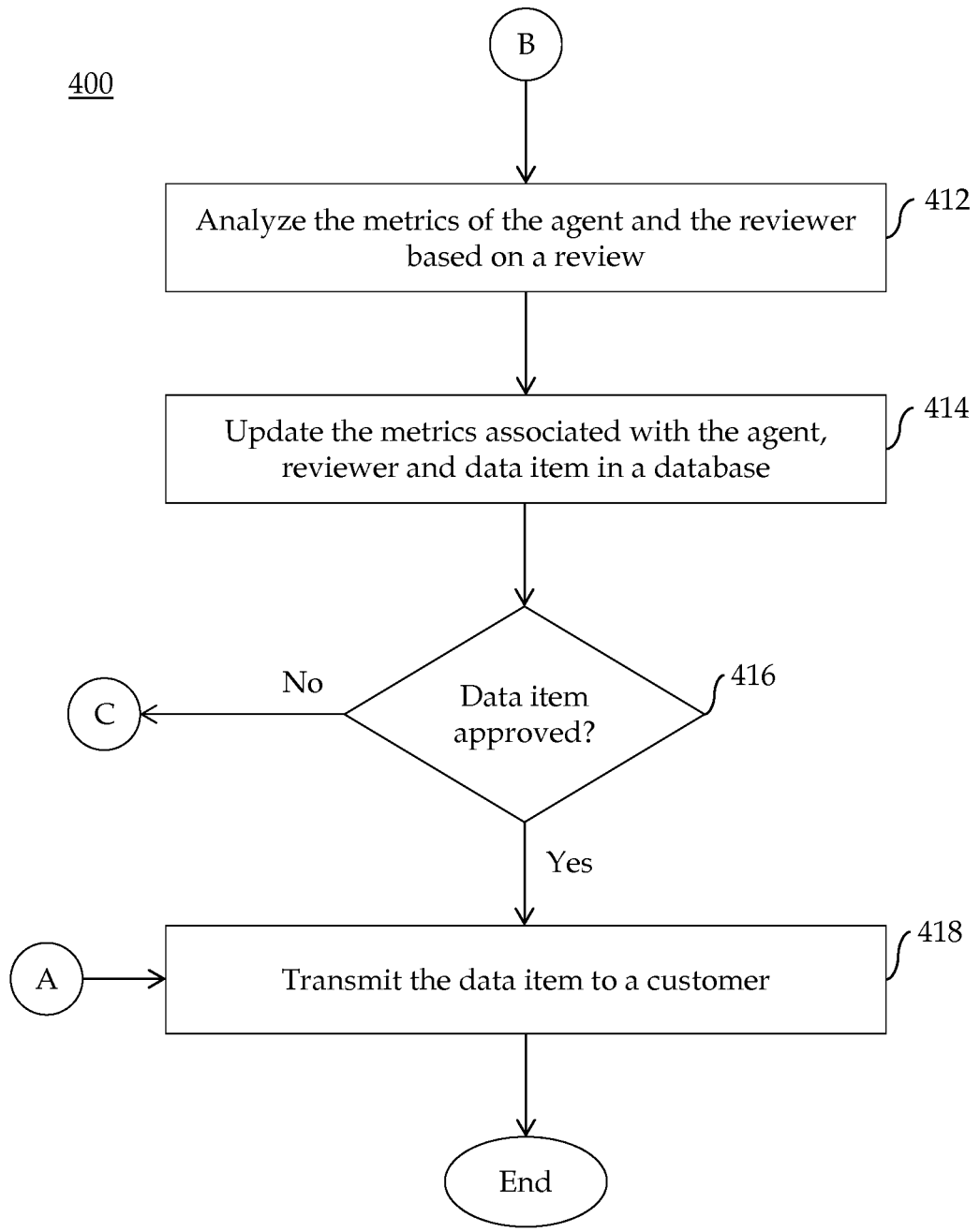

FIGS. 4A and 4B depict a flowchart of a method 400 for enhancing information flow in the contact center 100, according to another embodiment of the present invention.

At step 402, a computing system 228 receives a data item composed by an agent for review, in an embodiment of the present invention. The data item may include, but is not restricted to, an email, a document, a report, and so forth. In an embodiment of the present invention, the agent may be the author of the data item.

At step 404, the computing system 228 gathers and analyzes metrics associated with the data item and the agent. In an embodiment of the present invention, the metrics associated with the data item may include, but is not restricted to, a number of words in the data item, an elapsed time from start of composition time to completion time for the data item, time required to review previous data items from the agent, composition time of day, composition day of the week, a composition date of the data item, and so forth. The metrics associated with the agent may include, but is not restricted to, a number of simultaneous activities performed by the agent while composing the data item, a list of applications running on the agent's computer screen at the time of composition, a number of changes made to previous data items during a review by the agent, an average rating of the agent, and so forth.

At step 406, the computing system 228 determines whether the data item requires a review. For example, if the data item is composed by a supervisor of the contact center 100, then a review of the data item may not be required and the method 400 proceeds towards step 418. If the data item is composed by a new agent of the contact center 100, then there is a need to review the data item and the method 400 proceeds towards step 408.

At step 408, the computing system 228 selects a reviewer for reviewing the data item. In an embodiment of the present invention, a peer or another agent may be selected for reviewing the data item. A supervisor or manager of the contact center 100 may be selected for reviewing the data item, in another embodiment of the present invention. Further, the supervisor or the agent may be selected based on their availability and current workload.

At step 410, the computing system 228 provides a review rating of the data item to the reviewer. In an embodiment of the present invention, the review rating may include, but is not restricted to, a name of the agent composed the data item, total composition time for the data item, how much analysis (thoroughness) is required, and so forth. In an embodiment of the present invention, the rating associated with the data item may be displayed as an indicator, for example, a graphical icon (e.g., number of stars), a percentage value, a comment, etc. on the selected reviewer's computer screen. In an embodiment of the present invention, the review rating may be provided to a reviewer as an initial review notification that may be used to describe the thoroughness and optimum amount of time/effort required by the reviewer for reviewing the data item.

At step 412, the computing system 228 analyses the metrics of the agent and the reviewer based on a review of the data item. In an embodiment of the present invention, the computing system 228 analyses the agent's and the reviewer's performance based on the review. Each of the metrics is associated with a rating and/or weight and based on the analysis, and the metrics are updated in a database of the contact center 100 at step 414. The metrics are associated with, but is not limited to, the data item, agent, the reviewer, and so forth. In an embodiment of the present invention, the metrics may be stored in a single database of the contact center 100. The metrics may be replicated over multiple databases in the contact center 100.

At step 416, the computing module 228 determines whether the data item is fully reviewed and is approved for transmitting it to a customer. If the data item is to be reviewed again by another reviewer, the method 400 returns to the step 408. Otherwise, the computing system 228 transmits the data item to the customer at step 418.

In an exemplary embodiment, a data item is an email of 10 words and an author of the email has written it in appropriate amount of time such as 15 minutes, then the email may be directly transmitted to a recipient or a customer of the contact center 100. On the other hand, if the data item is a document of 10 thousand words, then the document requires a thorough review and an optimum review time. Further, if a reviewer spent only 5 minutes for reviewing the document of 10 thousand words, then the document is reviewed again by another agent or supervisor of the contact center 100 to improve its quality, before transmitting the document to the customer.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for enhanced information flow in an enterprise, the system comprising:
    a memory device storing executable code; and
    a processor in communication with the memory device, wherein the processor when executing the executable code:
        fetches, from a database, one or more stored metrics associated with a data item and at least one agent associated with the data item, wherein the at least one agent comprises an author of the data item;
        based on the one or more stored metrics, determines whether the data item requires a review;
        when the data item is determined to require a review:
            computes a rating for the data item based on the one or more stored metrics, wherein one of the one or more stored metrics associated with the at least one agent is a number of simultaneous activities performed by the author while composing the data item, a list of applications running on a computer associated with the author, or a number of times the author switches between the data item and other applications;
            computes a review parameter based on the rating of the data item, wherein the review parameter relates to an estimated review time required to review the data item;
            based on the computed review parameter, selects a reviewer to review the data item; and
            drives display of an indicator associated with the computed review parameter on a computer screen of a computer associated with the reviewer, wherein the indicator relates to the estimated review time; and
        when the data item is determined not to require review:
            transmits the data item to a customer without review.

2. The system of claim 1, wherein one of the one or more stored metrics associated with the data item is a number of words in the data item, an elapsed time from start of composition time to completion time for the data item, a time required to review previous data items from the author of the data item, a composition time of day, a composition day of the week, a composition date of the data item, a number of previous reviewers who have already reviewed the data item, or an amount of time spent on review by the previous reviewers of the data item.

3. The system of claim 1, wherein the author is a supervisor of the enterprise.

4. The system of claim 1, wherein:
    the at least one agent further comprises the reviewer of the data item; and
    one of the one or more stored metrics associated with the at least one agent is a number of simultaneous activities performed by the reviewer while reviewing the data item, an average rating of the reviewer, and a role of the reviewer in the enterprise.

5. The system of claim 1, wherein the processor when executing the executable code:
    based on the review of the data item, updates, in the database, at least one of the one or more stored metrics associated with the at least one agent and the data item.

6. The system of claim 1, wherein the processor when executing the executable code:
    when the data item is reviewed and approved, transmits the data item to the customer; and
    when the data item requires additional review, selects a second reviewer to review the data item, wherein the second reviewer is selected based on the computed review parameter.

7. The system of claim 1, wherein the indicator is one or more of a graphical icon, a percentage value, a comment, a rating value, or a time value.

8. The system of claim 1, wherein the rating of the data item relates to an estimated quality of content of the data item.

9. A computer-implemented method for enhancing information flow in an enterprise, the method comprising:
    fetching, by a processor of the enterprise from a database, one or more stored metrics associated with a data item and at least one agent associated with the data item, wherein the at least one agent comprises an author of the data item;
    based on the one or more stored metrics, determining, by the processor of the enterprise, whether the data item requires a review;
    when the data item is determined to require a review:
        computing, by the processor of the enterprise, a rating for the data item based on the one or more stored metrics, wherein one of the one or more stored metrics associated with the at least one agent is a number of simultaneous activities performed by the author while composing the data item, a list of applications running on a computer associated with the author, or a number of times the author switches between the data item and other applications;
        computing, by the processor of the enterprise, a review parameter based on the rating of the data item, wherein the review parameter relates to an estimated review time required to review the data item;
        based on the computed review parameter, selecting, by the processor of the enterprise, a reviewer to review the data item; and
        driving display, by the processor of the enterprise, of an indicator associated with the computed review parameter on a computer screen of a computer associated with the reviewer, wherein the indicator relates to the estimated review time; and
    when the data item is determined not to require review:
        transmitting, by the processor of the enterprise, the data item to a customer without review.

10. The method of claim 9, wherein one of the one or more stored metrics associated with the data item is a number of words in the data item, an elapsed time from start of composition time to completion time for the data item, a time required to review previous data items from an author of the data item, a composition time of day, a composition day of the week, a composition date of the data item, a number of previous reviewers who have already reviewed the data item, or an amount of time spent on review by the previous reviewers of the data item.

11. The method of claim 9, wherein the author is a supervisor of the enterprise.

12. The method of claim 9, wherein:
the at least one agent further comprises the reviewer of the data item; and
one of the one or more stored metrics associated with the at least one agent is a number of simultaneous activities performed by the reviewer while reviewing the data item, an average rating of the reviewer, and a role of the reviewer in the enterprise.

13. The method of claim 9, further comprising:
when the data item is reviewed and approved, transmitting, by the processor of the enterprise, the data item to the customer; and
when the data item requires additional review, selecting, by the processor of the enterprise, a second reviewer to review the data item, wherein the second reviewer is selected based on the computed review parameter.

14. The method of claim 9, wherein the indicator is one or more of a graphical icon, a percentage value, a comment, a rating value, or a time value.

15. The method of claim 9, further comprising:
based on the review of the data item, updating, by the processor of the enterprise, in the database, at least one of the one or more stored metrics associated with the at least one agent and the data item.

16. A computer-implemented method for enhancing information flow in an enterprise, the method comprising:
fetching, by a processor of the enterprise from a database, one or more stored metrics associated with a data item and at least one agent associated with the data item, wherein the at least one agent comprises an author of the data item;
based on the one or more stored metrics, determining, by the processor of the enterprise, whether the data item requires a review;
when the data item is determined to require a review:
computing, by the processor of the enterprise, a rating for the data item based on the one or more stored metrics, wherein one of the one or more stored metrics associated with the at least one agent is a number of simultaneous activities performed by the author while composing the data item, a list of applications running on a computer associated with the author, or a number of times the author switches between the data item and other applications;
updating, by the processor of the enterprise, the database with the rating of the data item;
computing, by the processor of the enterprise, a review parameter based on the updated rating of the data item, wherein the review parameter relates to an estimated review time required to review the data item;
based on the computed review parameter, selecting, by the processor of the enterprise, a reviewer to review the data item; and
driving display, by the processor of the enterprise, of an indicator for the computed review parameter on a computer screen of a computer associated with the reviewer, wherein the indicator relates to the estimated review time; and
when the data item is determined not to require review:
transmitting, by the processor of the enterprise, the data item to the customer without review.

17. The method of claim 16, wherein the indicator is one or more of a graphical icon, a percentage value, a comment, a rating value, or a time value.

18. The method of claim 16, further comprising:
based on the review of the data item, updating, by the processor of the enterprise, in the database, at least one of the one or more stored metrics associated with the at least one agent and the data item.

* * * * *

UNITED STATES PATENT AND TRADEMARK OFFICE
CERTIFICATE OF CORRECTION

PATENT NO. : 10,902,083 B2  
APPLICATION NO. : 14/302590  
DATED : January 26, 2021  
INVENTOR(S) : Peter Flannery et al.

It is certified that error appears in the above-identified patent and that said Letters Patent is hereby corrected as shown below:

In the Claims

Column 20, Line 30, Claim 16, "item to the customer" should read --item to a customer--.

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*